(12) United States Patent
Juan et al.

(10) Patent No.: US 9,718,513 B2
(45) Date of Patent: Aug. 1, 2017

(54) MULTI-LINK VEHICLE SUSPENSION SYSTEM

(71) Applicant: Gogoro Inc., Hong Kong (CN)

(72) Inventors: Ching Juan, New Taipei (TW); Jian-Cheng Lu, New Taipei (TW)

(73) Assignee: Gogoro Inc., Hong Kong (CN)

( * ) Notice: Subject to any disclaimer, the term of this patent is extended or adjusted under 35 U.S.C. 154(b) by 134 days.

(21) Appl. No.: 14/853,361

(22) Filed: Sep. 14, 2015

(65) Prior Publication Data

US 2016/0075397 A1    Mar. 17, 2016

Related U.S. Application Data

(60) Provisional application No. 62/050,633, filed on Sep. 15, 2014.

(51) Int. Cl.
*B62K 25/28* (2006.01)
*B62K 11/10* (2006.01)

(52) U.S. Cl.
CPC .......... *B62K 25/283* (2013.01); *B62K 11/10* (2013.01); *B62K 2202/00* (2013.01); *B62K 2204/00* (2013.01)

(58) Field of Classification Search
CPC ..... B62K 25/28; B62K 25/283; B62K 25/286
See application file for complete search history.

(56) References Cited

U.S. PATENT DOCUMENTS

| 3,917,313 | A | * | 11/1975 | Smith | B62K 25/26 180/227 |
|---|---|---|---|---|---|
| 4,058,181 | A | | 11/1977 | Buell | |
| 4,463,964 | A | * | 8/1984 | Takayanagi | B62K 5/027 180/215 |
| 4,789,174 | A | * | 12/1988 | Lawwill | B62K 25/14 280/284 |
| 5,067,580 | A | | 11/1991 | Parker | |
| 5,121,937 | A | * | 6/1992 | Lawwill | B62K 25/30 180/227 |

(Continued)

FOREIGN PATENT DOCUMENTS

EP    2 202 140    10/2010

OTHER PUBLICATIONS

International Search Report mailed Dec. 18, 2015, for corresponding International Application No. PCT/US2015/049942, 3 pages.

*Primary Examiner* — Joseph Rocca
*Assistant Examiner* — Michael Stabley
(74) *Attorney, Agent, or Firm* — Perkins Coie LLP

(57) ABSTRACT

A multi-link suspension includes a frame member, a first member pivotably coupled at a first end to the frame member, and a second member pivotably coupled at a first end to a second end of the first member. A dampener physically couples between the first member and the second member. The dampener limits the rotation of the second member about the second end of the first member to a defined arc. The first member includes a horizontal upper surface to which an electric traction motor providing a shaft output attaches. A power transmission system, such as a flexible belt, couples the shaft output provided by the electric traction motor to a drive hub rotatably attached to a second end of the second member.

43 Claims, 7 Drawing Sheets

(56) References Cited

U.S. PATENT DOCUMENTS

| | | | | |
|---|---|---|---|---|
| 5,332,246 | A * | 7/1994 | Buell | B62K 25/30 |
| | | | | 280/284 |
| 5,901,974 | A * | 5/1999 | Busby | B62K 25/28 |
| | | | | 188/24.14 |
| 5,908,078 | A * | 6/1999 | Belil Creixell | B62K 25/14 |
| | | | | 180/219 |
| 7,475,894 | B2 * | 1/2009 | Hodge | B60G 9/00 |
| | | | | 280/124.116 |
| 7,556,276 | B1 * | 7/2009 | Dunlap | B62K 25/30 |
| | | | | 280/284 |
| 7,641,015 | B2 * | 1/2010 | Hasegawa | B62K 25/24 |
| | | | | 180/219 |
| 7,730,988 | B2 * | 6/2010 | Igarashi | B62K 11/04 |
| | | | | 180/227 |
| 7,837,214 | B2 * | 11/2010 | Tribotte | B62K 25/286 |
| | | | | 280/283 |
| 7,913,793 | B2 * | 3/2011 | Kofuji | B62K 19/30 |
| | | | | 180/226 |
| 7,934,739 | B2 * | 5/2011 | Domahidy | B62K 25/286 |
| | | | | 280/275 |
| 8,496,083 | B2 * | 7/2013 | Igarashi | B62K 25/283 |
| | | | | 180/227 |
| 8,590,914 | B2 * | 11/2013 | Domahidy | B62K 25/286 |
| | | | | 280/284 |
| 9,039,026 | B2 * | 5/2015 | Hudec | B62K 25/04 |
| | | | | 280/283 |
| 2006/0017256 | A1 * | 1/2006 | Hupperich | B60G 9/00 |
| | | | | 280/124.156 |
| 2008/0236923 | A1 * | 10/2008 | Hasegawa | B62K 21/005 |
| | | | | 180/219 |
| 2014/0251710 | A1 * | 9/2014 | Juan | B60G 3/185 |
| | | | | 180/218 |

* cited by examiner

MULTI-LINK VEHICLE SUSPENSION SYSTEM

BACKGROUND

Technical Field

The present disclosure generally relates to vehicle suspensions and components used in the construction or fabrication of vehicle suspensions.

Description of the Related Art

Electric powered vehicles are gaining in popularity worldwide. As with many vehicles, providing a low cost, yet flexible and lightweight vehicle suspension capable of traversing a wide variety of improved and unimproved road conditions is necessary to ensure the comfort and safety of the vehicle operators in developed urban settings and less developed suburban settings worldwide. An example of such a suspension is a swingarm suspension found on many modern two-wheeled vehicles. In a swingarm suspension, one end of the swingarm is connected to a motorcycle's frame with bearings so that it can pivot. The rear axle around which the rear wheel turns is rotatably coupled to the other end of the swingarm. The swingarm is typically connected to the motorcycle's frame or rear sub-frame with one or two shocks with coil-over springs. When a swingarm is present on only one side of the motorcycle, this is known as a single-sided swingarm. Single-sided swingarms make rear-wheel removal easier, though they generally increase the unsprung weight of the rear suspension. This is due to the additional material required to give identical torsional rigidity to a conventional (two-sided) swingarm setup.

BRIEF SUMMARY

The Applicants have developed a multi-link vehicle suspension system that provides a low cost, yet flexible and lightweight suspension capable of traversing a wide variety of improved and unimproved road conditions. As an additional benefit, the Applicant's multi-link suspension facilitates physically mounting various components, including an electric traction motor and a fluid cooling system that cools the electric traction motor on the vehicle suspension, thereby improving access to these components for inspection, maintenance, or replacement.

The multi-link suspension includes a first member and a second member pivotably coupled in sequence. The first member couples at a first end to a frame member that forms or includes at least a portion of the vehicle frame. A first end of the second member pivotably couples to a second end of the first member. A drive hub capable of accommodating the physical coupling of a wheel assembly rotatably couples to a second end of the second member. A stanchion may project outwardly from the first member and a dampener, such as a coil-over shock absorber, may be coupled between the stanchion and the second member. The dampener limits the travel of the second member with respect to the first member to a second defined arc. In operation, the first member remains proximate the frame member while the second member pivots through the second arc, absorbing bumps and similar undulations in the road surface.

An electric traction motor, power transmission system, and fluid cooling system may be disposed in whole or in part on the first member. In operation, some or all of these components may be positioned in a space between an upper surface of the first member and the bottom of the frame member. Additionally or alternatively, vehicle bodywork covers some or all of the components mounted on the first member to improve or increase the weather resistance and security of the components. At times, the power transmission system includes a belt or shaft drive system or assembly linking the electric traction motor to the drive hub on the second end of the second member. The fluid cooling system fluidly couples the electric traction motor to one or more passive or active heat exchange or heat transfer devices (e.g., a forced, air-cooled, radiator) to cool the electric traction motor. Advantageously, to ease maintenance and/or service, the first member rotates through a first arc with respect to the frame member, exposing components such as the electric traction motor, the power transmission system, and fluid cooling system mounted on the upper surface of the first member.

A vehicle chassis may be summarized as including: a frame member having a longitudinal axis, an upper surface, a lower surface, and a first end and a second end disposed along the longitudinal axis of the frame member; a first member having a longitudinal axis and a first end and a second end disposed along the longitudinal axis of the first member, the first end of the first member pivotably coupled at a first pivot point to the lower surface of the frame member at a location intermediate between the first member first end and the first member second end; and the first member continuously pivotable through a first arc about the first pivot point, the first arc defined by a first angle measured between the longitudinal axis of the frame member and the longitudinal axis of the first member; a second member having a longitudinal axis and a first end and a second end disposed along the longitudinal axis of the second member, wherein the first end of the second member pivotably couples to the second end of the first member; a wheel mount member pivotably coupled to the second end of the second member; and a third member having a longitudinal axis and a first end and a second end disposed along the longitudinal axis of the third member; wherein the first end of the third member pivotably couples to a stanchion member physically affixed to the first member; and wherein the second end of the third member pivotably couples to the wheel mounting member.

The vehicle chassis may further include: a shaft having a longitudinal axis, a first end and a second end disposed along the longitudinal axis of the shaft pivotably attached to the first end of the frame member; the first end of the shaft operably coupled to a steering mechanism; and the second end of the shaft including a wheel mount. The shaft may include an oleo along the longitudinal axis of the shaft, the oleo including at least a stationary portion coupled to the first end of the shaft and a displaceable portion coupled to the wheel mount. The shaft may include a scissors link operably coupling the stationary portion of the oleo to the wheel mount. The vehicle chassis may further include: an electric traction motor mount physically coupled to the first member, the electric traction motor mount pivotable with the first member about the first pivot point. The vehicle chassis may further include: an electric traction motor fixedly coupled to the electric traction motor mount, the electric traction motor providing at least one shaft output. The vehicle chassis may further include: a transmission member operably coupling the at least one shaft output of the electric traction motor to an axle, the axle insertable in an aperture in the wheel mount member and rotatable about an axis normal to the longitudinal axis of the wheel mount member. The transmission member may include a flexible belt operably coupling the at least one shaft output of the electric traction motor to the axle. The transmission member may include a shaft member operably coupling the at least one shaft output of the electric traction motor to the axle. The frame member may further include at least one portable electric energy storage device receptacle. The vehicle chassis may further include: a number of electrical conductors electrically conductively coupling a portable electric energy storage device received in the portable electric energy storage device receptacle coupled to the frame member with the electric traction motor coupled to the first member. Each of at least some of the number of electrical conductors may include a first electrical connector on the vehicle frame and a complementary second electrical connector on the first member; wherein the first electrical connector electrically conductively engages the complementary second electrical connector when the first angle is at or below a first defined threshold value. The vehicle chassis may further include: a number of removable fasteners operably coupling the frame member to the first member. The number of removable fasteners fixedly operably coupling the frame member to the first member may maintain the longitudinal axis of the frame member parallel to the longitudinal axis of the first member. The frame member may include an arcuate shaped frame member wherein at least a portion of the upper surface forms a concave surface and at least a portion of the lower surface forms a convex surface. The lower surface of the frame member may include a recess that accommodates at least a portion of the first member. The vehicle chassis may further include a dampener fixedly coupled between the stanchion member and the wheel mount member, the dampener limiting the pivoting of the first end of the second member about the second end of the first member. The dampener may include a coil-over shock absorber that biases the second member to a defined position relative to the first member. The vehicle chassis may include a fluid cooling loop operably coupled to the first member, the fluid cooling loop fluidly coupled to at least the electric traction motor. The fluid cooling loop may include at least one air cooled radiator operably coupled to the first member.

A two-wheeled vehicle may be summarized as including: a frame member having a longitudinal axis, an upper surface, a lower surface, and a first end and a second end disposed along the longitudinal axis of the frame member; a steering assembly pivotably coupled to the first end of the frame member and at a fixed angle with respect to the longitudinal axis of the frame member, the steering assembly including: a shaft having a longitudinal axis and a first end and a second end disposed along the longitudinal axis of the shaft, the first end of the shaft operably coupled to a steering mechanism manipulable by a human driver and the second end of the shaft including a wheel mount; and a first member having a longitudinal axis and a first end and a second end disposed along the longitudinal axis of the first member, the first end of the first member pivotably coupled at a first pivot point to the lower surface of the frame member at a location intermediate to the frame member first end and the frame member second end; and the first member continuously pivotable through a first arc about the first pivot point, the first arc defined by a first angle measured between the longitudinal axis of the frame member and the longitudinal axis of the first member; a second member having a longitudinal axis and a first end and a second end disposed along the longitudinal axis of the second member, wherein the first end of the second member pivotably couples to the second end of the first member; a wheel mount member pivotably coupled to the second end of the second member; and a third member having a longitudinal axis and a first end and a second end disposed along the longitudinal axis of the third member; wherein the first end of the third member pivotably couples to a stanchion member physically affixed to the first member; and wherein the second end of the third member pivotably couples to the wheel mounting member.

The two-wheeled vehicle may further include: an electric traction motor mount physically coupled to the first member, the electric traction motor mount pivotable with the first member about the first pivot point. The two-wheeled vehicle may further include: an electric traction motor fixedly coupled to the electric traction motor mount, the electric traction motor providing at least one shaft output. The two-wheeled vehicle may further include: a transmission member operably coupling the at least one shaft output of the electric traction motor to an axle, the axle insertable in an aperture in the wheel mount member and rotatable about an axis normal to the longitudinal axis of the wheel mount member. The transmission member may include at least one of a flexible loop or a chain operably coupling the at least one shaft output of the electric traction motor to the axle. The transmission member may include a shaft member operably coupling the at least one shaft output of the electric traction motor to the axle. The frame member may further include at least one portable electric energy storage device receptacle. The vehicle chassis may further include: a number of electrical conductors electrically conductively coupling a portable electric energy storage device received in the portable electric energy storage device receptacle coupled to the frame member with the electric traction motor coupled to the first member. Each of at least some of the number of electrical conductors may include a first electrical connector on the vehicle frame and a complementary second electrical connector on the first member; wherein the first electrical connector electrically conductively engages the complementary second electrical connector when the first angle is at or below a first defined threshold value. The two-wheeled vehicle may further include: a number of removable fasteners operably coupling the frame member to the first member. The number of removable fasteners fixedly operably coupling the frame member to the first member may maintain the longitudinal axis of the frame member parallel to the longitudinal axis of the first member. The frame member may include an arcuate shaped frame member wherein at least a portion of the upper surface forms a concave surface and at least a portion of the lower surface forms a convex surface. The lower surface of the frame member may include a recess that accommodates at least a portion of the first member. The two-wheeled vehicle may further include a dampener fixedly coupled between the stanchion member and the wheel mount member, the dampener limiting the rotation of the first end of the second member about the second end of the first member. The dampener may include a coil-over shock absorber that biases the second member to a defined position with respect to the first member. The two-wheeled vehicle may further include a fluid cooling loop operably coupled to the first member, the fluid cooling loop fluidly coupled to at least the electric traction motor. The fluid cooling loop may include at least one air cooled radiator operably coupled to the first member.

A suspension for a motor vehicle may be summarized as including: a first member having a first longitudinal axis, a first end, and a second end, the first end pivotably coupleable to a motor vehicle chassis and rotatable through a first arc measured with respect to the motor vehicle chassis; a stanchion member having a first end and a second end, the first end of the stanchion member fixedly attached to an intermediate point of the first member between the first end and the second end of the first member, the second end of the stanchion member projecting outwardly from the first member at a first fixed angle measured with respect to the longitudinal axis of the first member; a second member having a first end and a second end, wherein the first end of the second member is pivotably coupled to the second end of the first member; a third member having a first end and a second end, wherein the first end of the third member is pivotably coupled to the second end of the stanchion member; a wheel mount member pivotably coupled to the second end of the second member and to the second end of the third member; a dampener operably coupled between the second end of the stanchion member and the second member to limit the rotation of the second member about the first member; and an axle rotatably coupled to an aperture in the wheel mount member and rotatable about an axis of rotation normal to the longitudinal axis of the first member.

The suspension for a motor vehicle may further include: an electric traction motor operably coupled to and pivotable with the first member, the electric traction motor providing at least one shaft output. The suspension for a motor vehicle may further include a transmission member operably coupling the shaft output of the electric traction motor to the axle such that the shaft output of the electric traction motor causes the axle to rotate about the axis of rotation. The transmission member may include a flexible loop operably coupling the at least one shaft output of the electric traction motor to the axle. The transmission member may include a shaft member operably coupling the at least one shaft output of the electric traction motor to the axle. The suspension for a motor vehicle may further include: a fluid cooling system physically coupled to and pivotable with the first member, the fluid cooling system fluidly coupled to the electric traction motor.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1A:
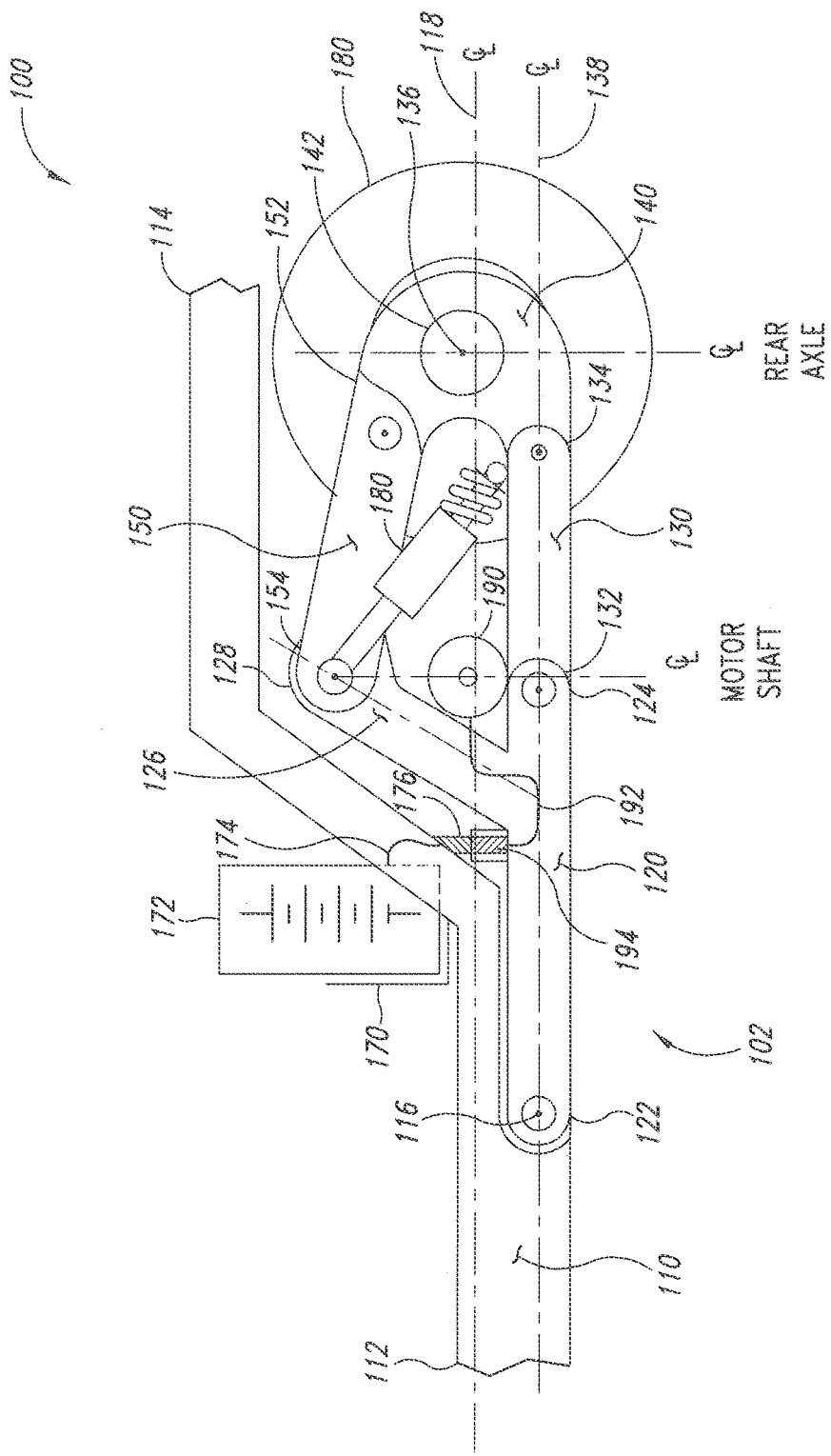
FIG. 1A is a schematic diagram showing an example multi-link suspension in a first (e.g., operating) mode in which a first member is positioned proximate the frame member, according to one non-limiting illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In some instances, well-known structures and/or materials associated with vehicular suspensions have been omitted for clarity and to avoid unnecessarily obscuring descriptions of the embodiments. Further, pivotable connections have been simplified by omitting components that are well known to those of ordinary skill in the art, for example bearings. Additionally, components such as portable electric energy storage devices and electric traction motors have been simplified by omitting components and/or details that are well known to those of ordinary skill in the art.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, supercapacitors or ultracapacitors. Reference to batteries means chemical storage cell or cells, for instance rechargeable or secondary battery cells including but not limited to nickel cadmium alloy or lithium ion battery cells.

Reference to electric traction motors means any type of direct or alternating current electric traction motor useful for providing a rotating shaft output. In some implementations, such electric traction motors may be fluid cooled, while in other implementations, such electric traction motors may be air-cooled. In some instances, the electric traction motor may include or supply a rotating shaft output to a gear reduction device or similar assembly that reduces (or increases) the rotational speed and/or torque of the shaft output. In some instances, the electric traction motor may include a torque converter or similar device to increase (or decrease) the torque provided by the electric traction motor.

The headings and Abstract of the Disclosure provided herein are for convenience only and do not interpret the scope or meaning of the embodiments.

Figure 1B:
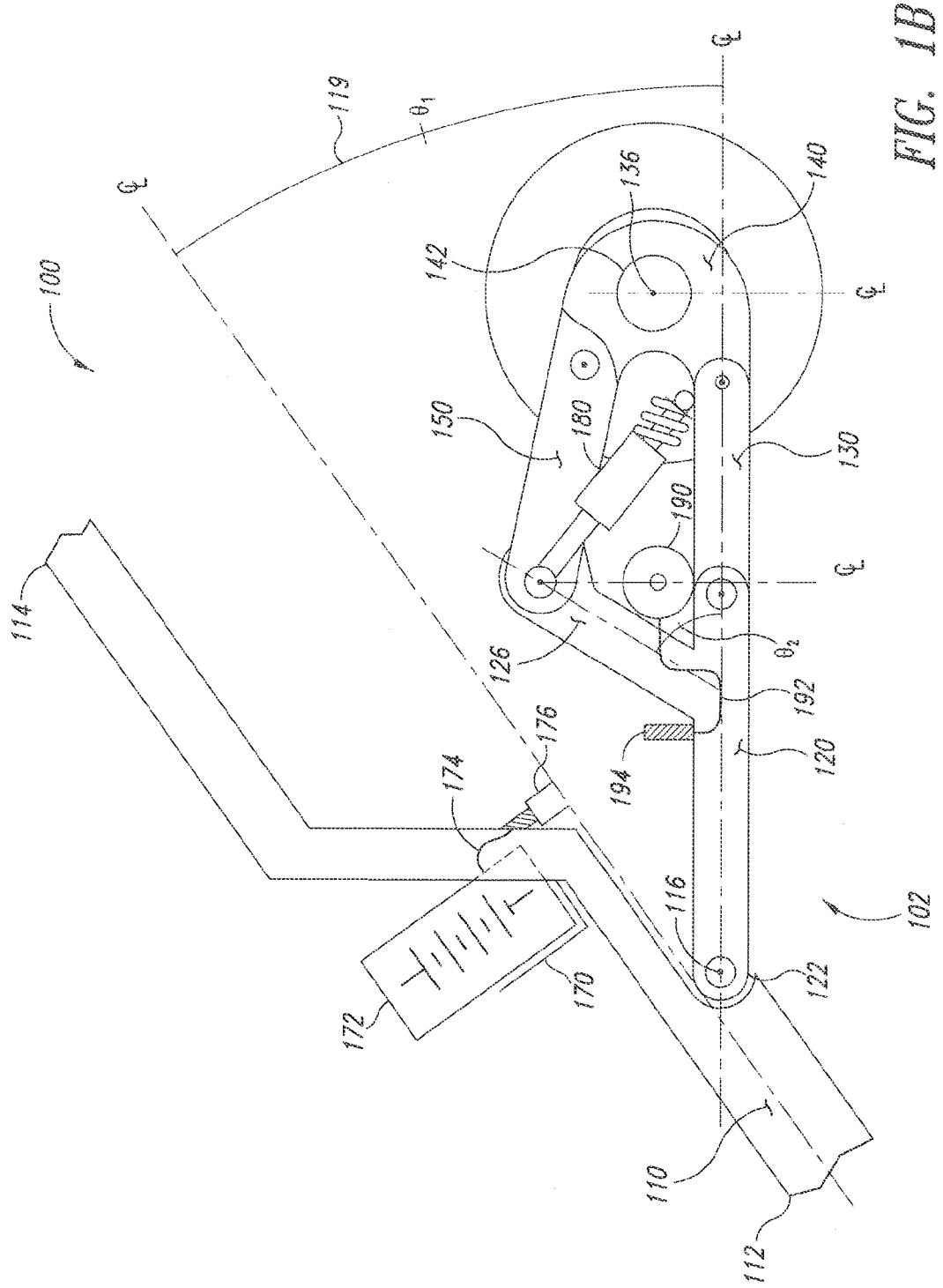
FIG. 1B is a schematic diagram showing an example multi-link suspension in a second (e.g., maintenance) mode in which the first member pivots through a first arc measured with respect to the frame member, exposing components carried by or fixedly coupled to the first member for service, according to one non-limiting illustrated embodiment.

FIGS. 1A and 1B show schematic diagrams of a system 100 that includes an illustrative multi-link suspension 102 pivotably coupled to a vehicle frame member 110. FIG. 1A depicts the multi-link suspension 102 in a first mode, representative of a vehicle in an operational state. FIG. 1B depicts the multi-link suspension 102 in a second mode, representative of a vehicle in an inspection, repair, or maintenance state. The vehicle includes a frame member 110 that serves as a primary structural and/or load carrying member of the vehicle and to which many of the remaining vehicular components couple. The multi-link suspension 102 includes a number of pivotable connected links 120, 130, 140, and 150 arranged to form a closed shape that is generally either trapezoidal or triangular.

The multi-link suspension 102 includes a first member 120 having a longitudinally opposed first end 122 and second end 124; a second member 130 having a longitudinally opposed first end 132 and a second end 134; a wheel mounting member 140; and a third member 150 having a longitudinally opposed first end 152 and a second end 154. The first member 120 also includes a stanchion member 126 either formed with or rigidly affixed to the first member 120. In some implementations, the stanchion member 126 may project at an angle ($\theta_2$) 127 from the first member 120 measured with respect to a longitudinal axis of the first member 120. Although the first member 120, second member 130, and third member 150 are depicted in FIGS. 1A and 1B as having generally straight configuration, all or a portion of any or all of the first member 120, second member 130, and third member 150 may have a curved, angular or arcuate configuration.

The first end 122 of the first member 120 pivotably couples to the frame member 110 at an intermediate point 116 between the first end 112 of the frame member 110 and the second end 114 of the frame member 110. In some implementations, the first end 122 of the first member 120 incorporates a single aperture permitting the pivotable coupling of the first end 122 of the first member 120 to the intermediate point 116 on the frame member 110 via a pinned or similarly hinged connection. In other implementations, the first end 122 of the first member 120 incorporates a plurality of apertures, for example in the form of a plurality of tangs each incorporating a single aperture. The aperture or each of the plurality of apertures on the first end 122 of the first member permits the pivotable coupling of the first member 120 to the intermediate point 116 on the frame member 110 via any number of pinned connections. In the first mode depicted in FIG. 1A, the longitudinal axis 118 of the frame member 110 and the longitudinal axis 138 of the multi-link suspension 102 are generally parallel (i.e., at an angle of 0° measured with respect to each other).

The frame member 110 can take any number of shapes or forms. In various embodiments, the frame member 110 can include any current or future developed frame that may include, but is not limited to at least one of: a planar member, a tube frame, a space frame, a tube and platform frame. The frame member 110 can carry one or more vehicular systems, components, or devices such as a vehicular controller, an electric motor liquid cooling system, one or more portable electric energy storage devices, and the like. In some implementations, at least a portion of the frame member 110 may be curved or arcuate in shape. Various materials of construction including, but not limited to metal, plastic, polymers, carbon fiber, or combinations thereof capable of providing sufficient strength and structural rigidity may be used in forming the frame member 110. The frame member 110 can carry a number of aesthetic, decorative, and/or aerodynamic body panels affixed or detachably attached to the frame member 110 using one or more fasteners, latches, or similar fixture devices. In one implementation, the frame member 110 may include a two-wheeled vehicle (e.g., motorbike, scooter, motorcycle) frame suitable for accommodating at least a vehicle operator and, optionally, one or more passengers and/or cargo.

With reference to FIG. 1B, the longitudinal axis 128 of the first member 120 pivots through a defined first arc 119 ($\theta_1$) measured with respect to the longitudinal axis 118 of the frame member 110. The defined first arc 119 includes angles of from about 0° in a first (i.e., operating) mode (e.g., FIG. 1A) to about 30° or more; about 45° or more; or about 60° or more in a second (i.e., maintenance or service) mode (e.g., FIG. 1B). Note, as shown in FIG. 1A, that at first arc 119 angle of 0° the longitudinal axis 118 of the frame member 110 is parallel or nearly parallel to the longitudinal axis 128 of the first member 120. When the first member 120 is swung through all or a portion of the first arc 119, components carried on the first member 120, for example electric traction motor 190 and the power transmission system linking the electric traction motor 190 and the rear wheel are accessible for inspection, maintenance, and/or service.

The second end 124 of the first member 120 pivotably couples to the first end 132 of the second member 130. In some implementations, the second end 124 of the first member 120 incorporates a single aperture permitting the pivotable coupling of the second end 124 of the first member 120 to the first end 132 of the second member 130 via a single pinned connection. In other implementations, the second end 124 of the first member 120 incorporates a plurality of apertures, for example in the form of a plurality of tangs each incorporating a single aperture (e.g., a forked connection). The aperture or each of the plurality of apertures on the second end 124 of the first member 120 permits the pivotable coupling of the first member 120 to the first end 132 of the second member 130 via any number of pinned connections.

The first member 120 can take any number of shapes or forms. In various embodiments, the first member 120 can include any current or future developed member that may include, but is not limited to at least one of: a planar member, a tube frame, a space frame, a tube and platform frame. The first member 120 can be formed from any material (e.g., metal, plastic, polymers, carbon fiber, or combinations thereof) providing sufficient strength and structural rigidity. Decorative or vehicle body panels may be permanently affixed or detachably attached to the first member 120.

In some implementations, at least a portion of the first member 120 may be in the form of a thickened, horizontal, planar structure having an upper surface and a lower surface. In such implementations, the upper surface of the first member 120 may carry various vehicular components, systems, and/or subsystems. For example, the upper surface of the first member 120 may carry a cooling system for use with a liquid cooled electric traction motor 190. At times, vehicle bodywork and/or body panels may at least partially cover or obscure the components positioned on or affixed to the upper surface of the first member 120 when the vehicle is placed in the first mode depicted in FIG. 1A. In some implementations, apertures or other aerodynamic features (e.g., NACA ducts) are incorporated into the lower surface of the first member 120 to direct airflow from beneath the vehicle across or around one or more components positioned on the upper surface of the first member 120.

The second member 130 operably couples the first member 120 to the wheel mount member 140 that includes an aperture 142 capable of accommodating the insertion of an axle. In some implementations, when received in the aperture 142, an axle may rotate about an axis that is normal to the longitudinal axis 138 of the multi-link suspension 102. The first end 132 of the second member 130 pivotably couples to the second end 124 of the first member 120. The second end 134 of the second member 130 pivotably couples to the wheel mount member 140.

A prime mover, for example electric traction motor 190, mounted on or attached to the first member 120, couples to a torque transmission member, device, and/or system such that the shaft output produced by the electric traction motor 190 causes the axle carried by the wheel mount member 140 to rotate about an axis 136. In some instances, a power transmission system or device such as a drive belt or chain may transmit at least a portion of the shaft output of the prime mover to the axle carried by the wheel mount member 140. In another example, a drive shaft, torque tube, or similar rotating member may transfer at least a portion of the shaft output from the electric traction motor 190 to the axle carried by the wheel mount member 140.

In some implementations, the first end 132 of the second member 130 incorporates at least one aperture permitting the pivotable coupling of the first end 132 of the second member 130 to the second end 124 of the first member 120. A pinned connection links the first member 120 to the second member 130. At times, one or more bearings or other friction reducing devices, structures or materials incorporated into at least a portion of the pivotable connection lessens rotational friction between the first member 120 and the second member 130.

In other implementations, the first end 132 of the second member 130 incorporates a plurality of apertures, for example in the form of a plurality of tangs each incorporating at least one aperture. A forked connection having two tangs, each with a single aperture provides one example of such a connection. In such an implementation, a member such as one or more pins inserted through some or all of the plurality of apertures on the first end 132 of the second member 130 pivotably link the second member 130 to the first member 120. At times, one or more bearings or other friction reducing devices, structures, or materials incorporated into at least a portion of the pivotable connection lessens rotational friction between the first member 120 and the second member 130.

The second member 130 can take any number of shapes or forms. In various embodiments, the second member 130 can include any current or future developed member that may include, but is not limited to at least one of: a planar member, a tube frame, a space frame, a tube and platform frame. The second member 130 can include a solid, hollow, or partially solid and partially hollow member. At times, the second member 130 includes one or more curved or arcuate shaped members, transitions, or sections. The second member 130 can be formed from any material (e.g., metal, plastic, polymers, carbon fiber, or combinations thereof) providing sufficient strength and structural rigidity. Decorative or vehicle body panels may be permanently affixed or detachably attached to the second member 130.

The wheel mount member 140 pivotably couples to the second end 134 of the second member 130. The wheel mount member 140 includes an aperture 142 for receiving an axle that rotates about the axis 136. At times, the axis 136 is normal to (i.e., forms a 90° angle with) the longitudinal axis 138 of the multi-link suspension 102. The wheel mount member 140 and/or axle inserted therein can include one or more features facilitating the selective, coupling and uncoupling of a wheel and tire assembly. For example, the wheel mount member 140 may include any number of threaded shafts used to rotatably attach a wheel and tire to the wheel mount member 140. At times, one or more braking systems (e.g., disc or drum brakes) may be operably coupled to the wheel mount member 140. Such braking systems may selectively reduce, retard, or halt the rotation of an axle inserted in the aperture 142 in the wheel mount member 140. At times, one or more bearings or other friction reducing devices, structures, or materials incorporated into at least a portion of the rotatable connection between the wheel mount member 140 and the second member 130 lessens rotational friction between the wheel mount member 140 and the second member 130. To protect the vehicle user from entanglement or injury due to the power transmission systems coupling the electric traction motor 190 to the axle inserted into the aperture 142 in the wheel mount member 140, one or more protective or decorative housings may at least partially cover (e.g., the rotating portions) the second member 130, the wheel mount member 140, and/or the power transmission system operably coupling the electric traction motor 190 to the axle.

A third member 150 operably couples the wheel mount member 140 to the stanchion member 126 affixed to the first member 120. The third member 150 includes a first end 152 and a second end 154 along a longitudinal axis of the third member. In some implementations, the first end 152 of the third member 150 incorporates at least one aperture permitting the pivotable coupling of the first end 152 to the wheel mount member 140. A pinned connection links the third member 150 to the wheel mount member 140. At times, one or more bearings or other friction reducing devices, structures or materials incorporated into at least a portion of the pivotable connection lessens rotational friction between the third member 150 and the wheel mount member 140.

In other implementations, the first end 152 of the third member 150 incorporates a plurality of apertures, for example in the form of a plurality of tangs each incorporating at least one aperture. A forked connection having two tangs, each with a single aperture provides one example of such a connection. In such an implementation, a member such as one or more pins inserted through some or all of the plurality of apertures on the first end 152 of the third member 150 pivotably link the third member 150 to the wheel mount member 140.

The third member 150 can take any number of shapes or forms. In various embodiments, the third member 150 can include any current or future developed member that may include, but is not limited to at least one of: a planar member, a tube frame, a space frame, a tube and platform frame. The third member 150 can include a solid, hollow, or partially solid and partially hollow member. At times, the third member 150 includes one or more curved or arcuate shaped members, transitions, or sections. The third member 150 can be formed from any material (e.g., metal, plastic, polymers, carbon fiber, or combinations thereof) providing sufficient strength and structural rigidity. At times, the third member 150 may carry one or more aesthetic, decorative, and/or aerodynamic body panels.

The second end 154 of the third member 150 operably couples, via one or more hinged connections, to the stanchion member 126 affixed to the first member 120. In some instances, the second end 154 of the third member 150 incorporates at least one aperture permitting the pivotable coupling of the second end 154 to the stanchion member 126. In such instances, a pinned connection links the third member 150 to the stanchion member 126. At times, one or more bearings or other friction reducing devices, structures or materials incorporated into at least a portion of the pivotable connection lessens rotational friction between the third member 150 and the stanchion member.

One or more dampeners 180 operably couple the second end 154 of the third member 150 to the wheel mount member 140. The one or more dampeners 180 mitigate the transmission of undulations and irregularities present in uneven or unimproved surfaces to the vehicle operator and/or passengers. The one or more dampeners 180 can include any current or future developed shock absorption systems, devices, or technologies. Examples of such technologies include conventional shock absorbers, coil-over shock absorbers, struts, gas or liquid filled shock absorbers, electromagnetic shock absorbers, or combinations thereof.

A first end of the one or more dampeners 180 pivotably couples to an end 128 of the stanchion member 126 at a location distal from the first member 120. At times, the second end of the one or more dampeners 180 pivotably couples to the wheel mount member 140. At times, the second end of the one or more dampeners 180 pivotably couples to an intermediate point along the longitudinal axis of the second member 130 at an intermediate point between the first end 132 and the second end 134 of the second member 130.

In operation, the first member 120, second member 130, the wheel mount member 140, the third member 150 and the one or more dampeners 180 limit the relative motion between an axle inserted into the aperture 142 of the wheel mount member 140 and the output shaft of the electric traction motor 190. Limiting the relative motion between an axle inserted into aperture 142 and the output shaft of the electric traction motor 190 beneficially maintains a constant tension on the power transmission system (e.g., belt and/or chain) linking the axle to the output shaft of the electric traction motor 190. In some instances, the overall change in relative motion between an axle inserted into aperture 142 and the output shaft of the electric traction motor 190 is maintained at less than 0.1 millimeters (mm), less than 0.05 mm, less than 0.03 mm, or less than 0.02 mm when the wheel carried by the axle is at no load (i.e., off the ground) and when the wheel carried by the axle inserted into aperture 142 is at a load of 1G (i.e., the wheel is on the ground and supporting the weight of the vehicle).

The frame member 110 may include one or more portable electric energy storage device compartments 170. Each of the portable electric energy storage device compartments 170 accommodates the at least partial insertion of one or more portable electric energy storage devices 172. The portable electric energy storage devices 172 include a number of terminals electrically conductively couple to a connector 176 via one or more respective conductors 174. One or more conductors 192 extend from the electric traction motor 190 to a complementary connector 194 that electrically conductively couples to a respective corresponding connector 176 when the first member 120 is positioned in the first (i.e., operating) mode. In some implementations, the connector 176 and the corresponding complementary connector 194 electrically decouple or assume an electrically discontinuous state when the first member 120 is positioned in the second (i.e., maintenance) mode that places the frame member 110 at an angle within the defined first arc 119. In other implementations, the connector 176 and the corresponding complementary connector 194 electrically decouple or assume an electrically discontinuous state when the first member 120 is placed in any position other than the first mode (i.e., upon transitioning the first member 120 is moved or rotated away from frame member 110).

The electric traction motor 190 includes one or more systems, devices, or combinations of systems and devices capable of converting electric power supplied by the portable electric energy storage device 172 to a shaft output. At times, the electric traction motor 190 may include one or more air-cooled (e.g., totally enclosed non-ventilated "TENV" or totally enclosed fan cooled ("TEFC")) direct current (DC) or single/multi-phase alternating current (AC) motors. At other times, the electric traction motor 190 may include one or more fluid or liquid cooled DC or AC motors. An AC/DC converter carried in the portable electric energy storage device 172 or onboard the vehicle converts the DC output provided by the portable electric energy storage device 172 to an AC output. Where the vehicle carries such an AC/DC converter, the horizontal upper surface of the first member 120 may carry the one or more AC/DC converters. Where the vehicle carries one or more fluid cooled electric traction motors 190, the upper surface of the first member 120 may carry the fluid circulating loop and heat exchange equipment such as air-cooled radiators, air movers, and the like.

Figure 2:
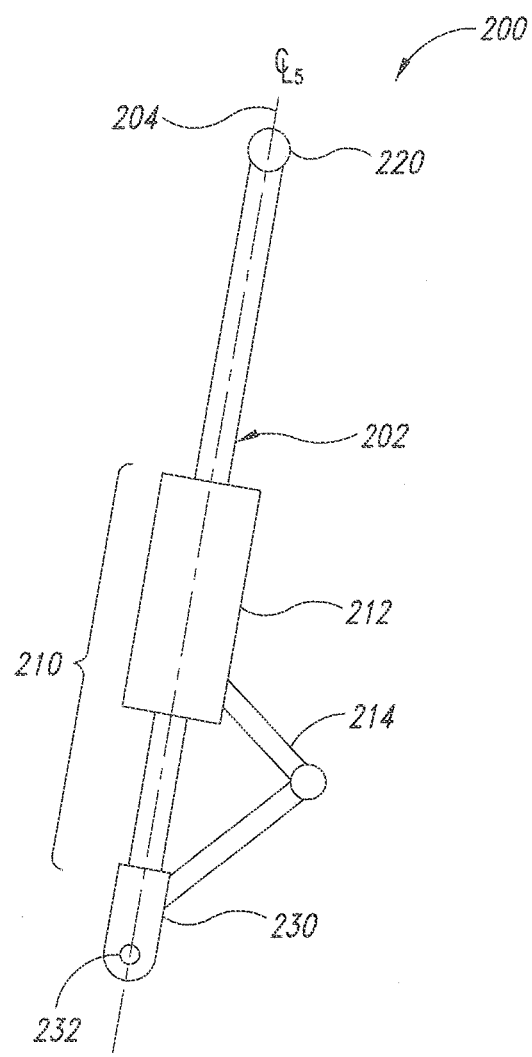
FIG. 2 is a schematic diagram showing an example front suspension pivotably attachable to the frame member and which includes a shaft having a longitudinal axis, an oleo assembly, and a wheel mount, according to one non-limiting illustrated embodiment.

FIG. 2 shows an example front suspension 200 useful on a vehicle in conjunction with the multi-link suspension 102 depicted in FIGS. 1A and 1B, according to one illustrated embodiment. The front suspension 200 includes a shaft 202 having a longitudinal axis 204. At a first end of the longitudinal axis 204, shaft 202 includes a steering mechanism 220 that is manipulable by the vehicle operator to control the direction of travel of the vehicle. At a second end of the longitudinal axis 204, the shaft 202 includes a shock absorbing oleo 210 that includes a dampener 212 and a scissors link 214 attached to a wheel mount 230. The oleo 210 permits the axial displacement of the wheel mount 230 along the longitudinal axis 204 of the shaft 202. The wheel mount 230 permits a wheel to rotate about an axis 232 normal to the longitudinal axis 204 of the shaft 202.

In some implementations, the front suspension 200 includes one or more braking devices or systems to reduce, retard, or halt the rotation about the axis 232 of a wheel attached to the wheel mount 230. Although not depicted in FIG. 2, the one or more braking devices may include a disc brake system, a drum brake system, an electromagnetic braking system, a regenerative braking system, or combinations thereof. At times, a regenerative braking system may advantageously provide an electrical input to one or more portable electric energy storage devices 172 carried by the frame member 110.

Figure 3A:
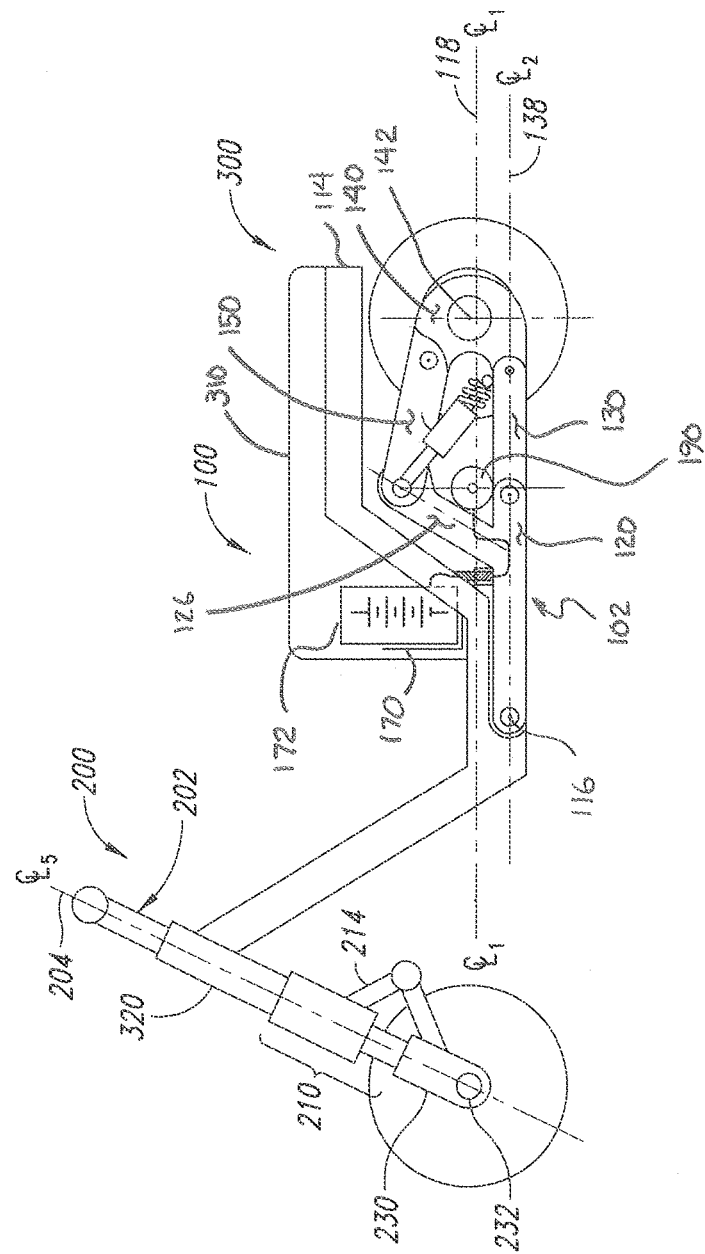
FIG. 3A is a schematic diagram of an illustrative electric two-wheeled vehicle using the multi-link suspension depicted in FIG. 1A in the first (i.e., operating) mode; the vehicle includes a portable electric energy storage device compartment and a portable electric energy storage device to power an electric traction motor powering the two-wheeled vehicle, according to one non-limiting illustrated embodiment.

FIG. 3A shows a vehicle 300 that includes an illustrative multi-link suspension 102 positioned in the first (i.e., operating) mode as shown in FIG. 1A and an illustrative front suspension 200 as described in FIG. 2, both coupled to a common frame member 110, according to one illustrated embodiment. The vehicle includes a seating surface 310 for the vehicle operator and a number of passengers. In some implementations, the portable electric energy storage device compartment 170 and the portable electric energy storage device 172 contained therein may be disposed partially or completely within a void formed within the seating surface 310. Positioning the portable electric energy storage device 172 within such a void advantageously protects the portable electric energy storage device 172 from damage and/or performance degradation associated with exposure to adverse environmental conditions.

In the first mode depicted in FIG. 3A, the longitudinal axis 128 of the first member 120 maintains an angle of approximately 0° (i.e., is coaxial with or parallel to) the longitudinal axis 118 of the frame member 110. A fluid-cooled electric traction motor 190 and a fluid circulating and cooling system 320 are disposed on the upper surface of the first member 120. In some implementations, the fluid-cooled electric traction motor 190 and a fluid circulating and cooling system 320 may be at least partially covered, protected, or concealed by vehicle bodywork such as the seating surface 310 when the first member 120 is disposed in a position corresponding to the first mode.

In some instances, one or more fasteners (not shown in FIG. 3A) maintain the first member 120 in the first mode. Such fasteners may include tool-less clips, finger latches, spring latches, or similar retainers. Such fasteners may also include screws, bolts or similar hardware requiring tools for removal. In some instances, such fasteners may include one or more tamper resistant or tamper evident fasteners that provide an indication if the fastener has been partially or completely removed.

The front suspension 200 rotatably attaches to the first end 112 of frame member 110 via a head tube or similar structure permitting the rotation of the front suspension 200 about the longitudinal axis 204 of the shaft 202. One or more controls, indicators, and/or supplemental systems operably couple to the shaft 202 and/or the steering mechanism 220. For example, hand operated brake controls may be disposed on the steering mechanism, thereby permitting the vehicle operator to manipulate the braking of the vehicle without removing their hands from the steering mechanism. Various indicators (e.g., speed, portable electric energy storage device charge, motor temperature, and similar) may be physically coupled to shaft 202. Such indicators may take the form of analog and/or digital instruments disposed in a housing physically coupled to shaft 202. Additional devices such as one or more headlights and one or more turn indicators may be disposed in housings physically coupled to the shaft 202.

Figure 3B:
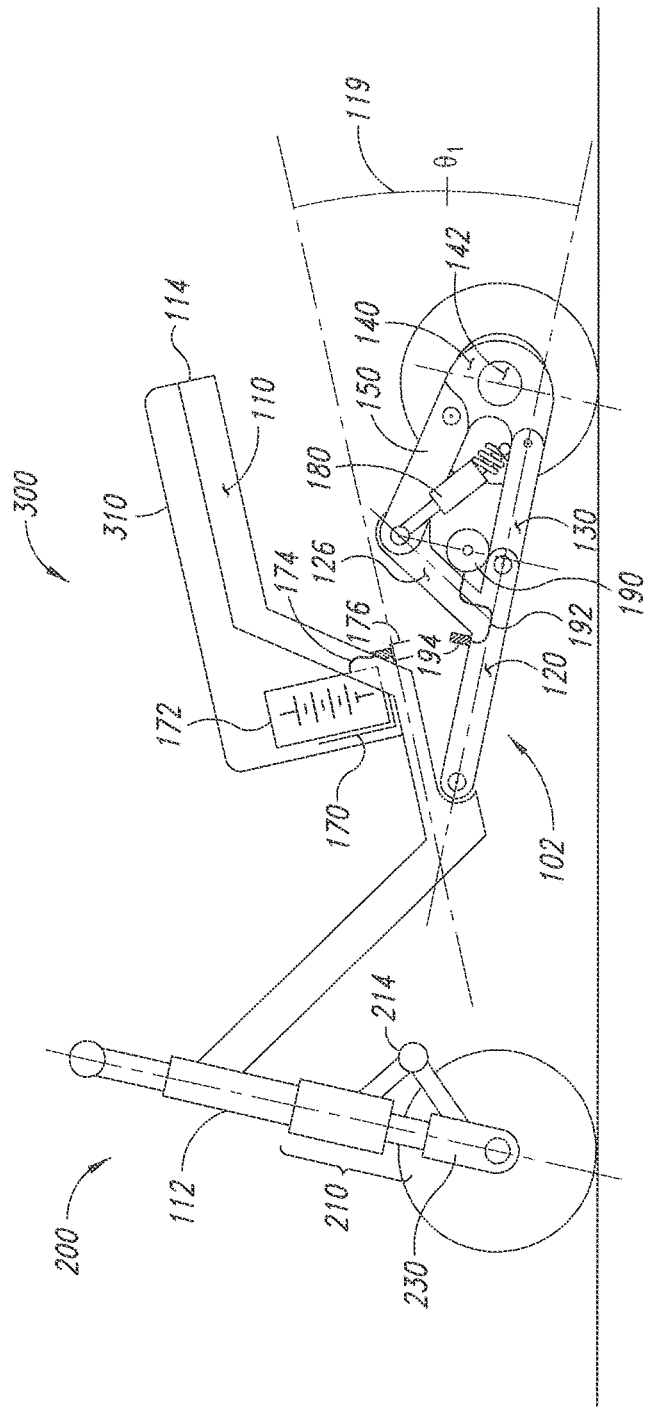
FIG. 3B is a schematic diagram of an illustrative electric two-wheeled vehicle using the multi-link suspension in the second (i.e., maintenance) mode with the first member swung through a first defined arc with respect to the frame member to provide improved access to the electric traction motor, transmission, and dampener, according to one non-limiting illustrated embodiment.

FIG. 3B shows a vehicle 300 that includes an illustrative multi-link suspension 102 positioned in the second (i.e., service or maintenance) mode as shown in FIG. 1B and an illustrative front suspension 200 as described in FIG. 2, both coupled to a frame member 110, according to one illustrated embodiment. In the second mode, the first member 120 is rotated about the intermediate point 116 of attachment to the frame member 110 through the first defined arc 119 such that an angle ($\theta_1$) forms between the longitudinal axis 118 of the frame member 110 and the longitudinal axis 128 of the first member 120. The second mode exposes the electric traction motor 190, the fluid-cooling system 320, and other components (e.g., AC/DC converter) carried on the upper surface of the first member 120 for maintenance and/or service. The second mode advantageously permits the front and rear wheels to remain in contact with the ground during such maintenance or service activities, thereby eliminating the need for a specialized service or maintenance stand. Additionally, access to other components such as the at least one dampener 180, also improves when the vehicle bodywork is raised away from (or off) the first member 120.

Figure 3C:
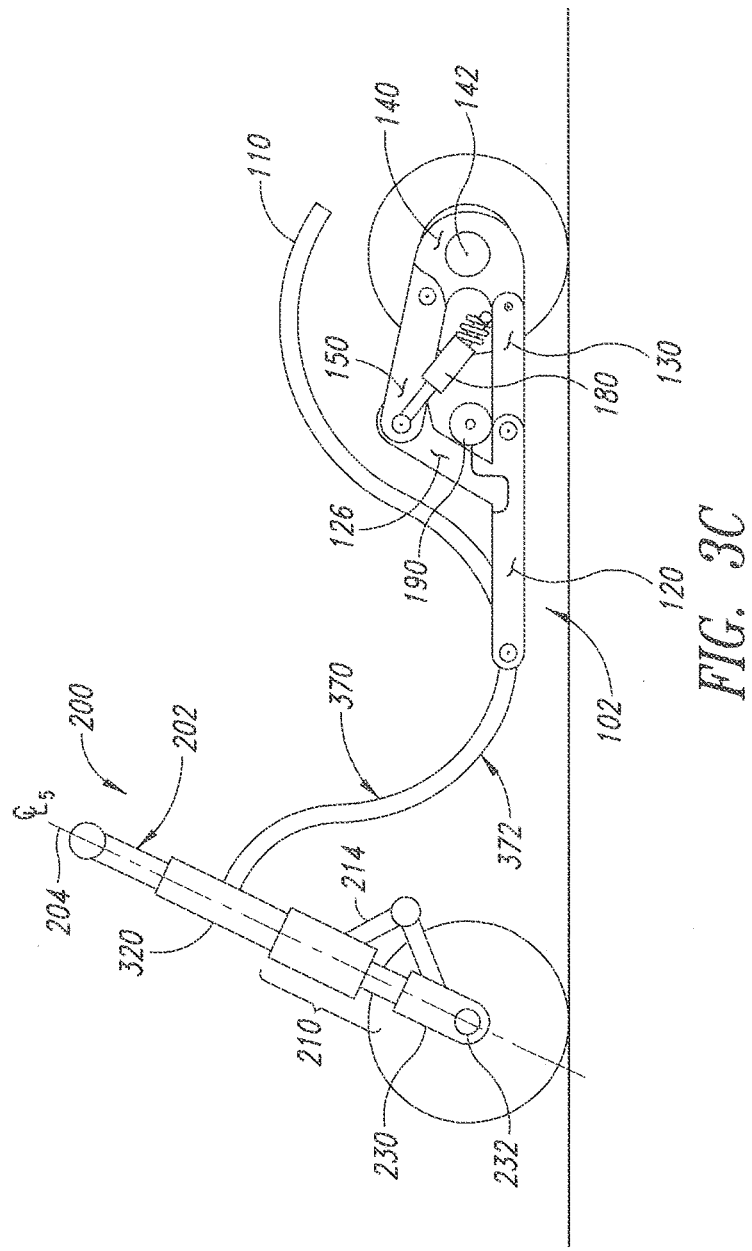
FIG. 3C is a schematic diagram of an illustrative electric two-wheeled vehicle having an arcuate shaped frame member using the multi-link suspension depicted in FIG. 1A in the first (i.e., operating) mode, according to one non-limiting illustrated embodiment.

FIG. 3C shows another vehicle that includes an illustrative multi-link suspension 102 positioned in the first (i.e., operating) mode as shown in FIG. 1A and an illustrative front suspension 200 as described in FIG. 2, both coupled to a frame member 110, according to one illustrated embodiment. As depicted in FIG. 3C, the vehicle 300 includes an arcuate shaped frame member 110. At times, the arcuate shaped frame member 110 includes a concave upper surface 370. At times, the arcuate shaped frame member 110 includes a convex lower surface 372. At other times, the arcuate shaped frame member 110 includes a concave upper surface 370 and a convex lower surface 372.

Figure 4:
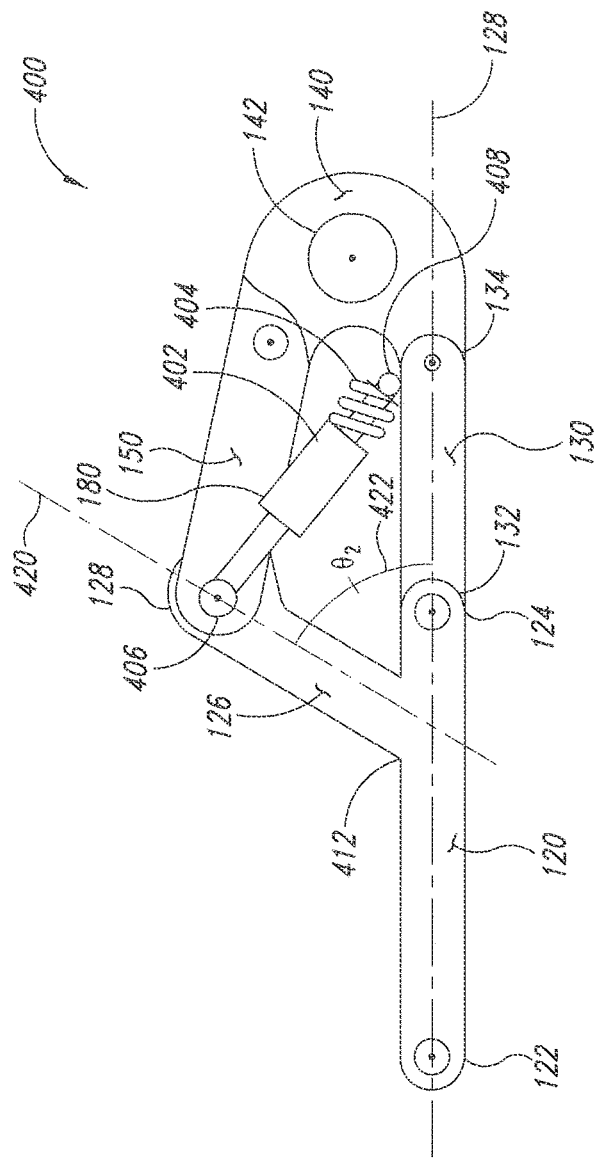
FIG. 4 is a schematic diagram of an illustrative multi-link suspension such as that illustrated in FIGS. 1A-3B, providing additional detail on the stanchion member and dampener, according to one non-limiting illustrated embodiment.

FIG. 4 shows an example multi-link suspension 400 that includes a stanchion member 126 affixed at an angle ($\theta_2$) 422 to the first member 120, according to one illustrated embodiment. The stanchion member 126 can include a first end 412 attached to the first member 120 and a second end 128 to which one end of the at least one dampener 180 attaches. A longitudinal axis 420 of the stanchion member 126 and the longitudinal axis 128 of the first member 120 form a fixed angle 422. At times, the stanchion member 126 may be formed integrally with the first member 120, for example through casting or welding. At other times, permanent attachment fixtures or removable attachment fixtures (e.g., screws, bolts) affix the stanchion member 126 to the first member 120.

The dampener 180 can include one or more coil-over shock absorbers, each having a first end 406 pivotally affixed to the stanchion member 126 and a second end 408 pivotably affixed, in some instances, to the wheel mount member 140. In other instances, the second end 408 of the dampener 180 can be affixed at a point along the second member 130 that is intermediate between the first end 132 and the second end 134. The coil-over shock absorber can include a fluid (i.e., gas or liquid) filled shock absorber body 402 and a coil 404 positioned relative to the fluid filled shock absorber body 402 such that any displacement of the wheel mount member 140 exerts a compressive force on the dampener 180 that is resisted by the fluid-filled shock absorber body 402 and/or the coil-over 404. The use of a coil-over dampener 180 advantageously permits the adjustment of ride stiffness and shock rebound rate by swapping the coil 404 rather than requiring replacement of the entire dampener 180.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/601,949, entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012; U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011; U.S. provisional patent application Ser. No. 61/511,887, entitled "THERMAL MANAGEMENT OF COMPONENTS IN ELECTRIC MOTOR DRIVE VEHICLES" and filed Jul. 26, 2011; U.S. provisional patent application Ser. No. 61/783,041, entitled "APPARATUS, SYSTEM, AND METHOD FOR AUTHENTICATION OF VEHICULAR COMPONENTS" and filed Mar. 14, 2013; and U.S. provisional patent application Ser. No. 61/511,880, entitled "DYNAMICALLY LIMITING VEHICLE OPERATION FOR BEST EFFORT ECONOMY" and filed Jul. 26, 2011; are incorporated herein by reference, in their entirety. Aspects of the embodiments can be modified, if necessary, to employ systems, circuits and concepts of the various patents, applications and publications to provide yet further embodiments.

While generally discussed in the environment and context of collection and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A vehicle chassis comprising:
 a frame member having a longitudinal axis, an upper surface, a lower surface, and a first end and a second end disposed along the longitudinal axis of the frame member;
 a first member having a longitudinal axis and a first end and a second end disposed along the longitudinal axis of the first member,
  the first end of the first member pivotably coupled at a first pivot point to the lower surface of the frame member at a location intermediate between the first member first end and the first member second end; and
  the first member continuously pivotable through a first arc about the first pivot point, the first arc defined by a first angle measured between the longitudinal axis of the frame member and the longitudinal axis of the first member;
 a second member having a longitudinal axis and a first end and a second end disposed along the longitudinal axis of the second member, wherein the first end of the second member pivotably couples to the second end of the first member;
 a wheel mount member pivotably coupled to the second end of the second member; and
 a third member having a longitudinal axis and a first end and a second end disposed along the longitudinal axis of the third member;
  wherein the first end of the third member pivotably couples to a stanchion member physically affixed to the first member; and
  wherein the second end of the third member pivotably couples to the wheel mounting member.

2. The vehicle chassis of claim 1, further comprising:
 a shaft having a longitudinal axis, a first end and a second end disposed along the longitudinal axis of the shaft pivotably attached to the first end of the frame member;
  the first end of the shaft operably coupled to a steering mechanism; and
  the second end of the shaft including a wheel mount.

3. The vehicle chassis of claim 2 wherein the shaft comprises an oleo along the longitudinal axis of the shaft, the oleo including at least a stationary portion coupled to the first end of the shaft and a displaceable portion coupled to the wheel mount.

4. The vehicle chassis of claim 3 wherein the shaft includes a scissors link operably coupling the stationary portion of the oleo to the wheel mount.

5. The vehicle chassis of claim 1, further comprising:
an electric traction motor mount physically coupled to the first member, the electric traction motor mount pivotable with the first member about the first pivot point.

6. The vehicle chassis of claim 5, further comprising:
an electric traction motor fixedly coupled to the electric traction motor mount, the electric traction motor providing at least one shaft output.

7. The vehicle chassis of claim 6, further comprising:
a transmission member operably coupling the at least one shaft output of the electric traction motor to an axle, the axle insertable in an aperture in the wheel mount member and rotatable about an axis normal to the longitudinal axis of the wheel mount member.

8. The vehicle chassis of claim 7 wherein the transmission member comprises a flexible belt operably coupling the at least one shaft output of the electric traction motor to the axle.

9. The vehicle chassis of claim 7 wherein the transmission member comprises a shaft member operably coupling the at least one shaft output of the electric traction motor to the axle.

10. The vehicle chassis of claim 6 wherein the frame member further comprises at least one portable electric energy storage device receptacle.

11. The vehicle chassis of claim 10, further comprising:
a number of electrical conductors electrically conductively coupling a portable electric energy storage device received in the portable electric energy storage device receptacle coupled to the frame member with the electric traction motor coupled to the first member.

12. The vehicle chassis of claim 11 wherein each of at least some of the number of electrical conductors include a first electrical connector on the vehicle frame and a complementary second electrical connector on the first member;
wherein the first electrical connector electrically conductively engages the complementary second electrical connector when the first angle is at or below a first defined threshold value.

13. The vehicle chassis of claim 1, further comprising:
a number of removable fasteners operably coupling the frame member to the first member.

14. The vehicle chassis of claim 13 wherein the number of removable fasteners fixedly operably coupling the frame member to the first member maintain the longitudinal axis of the frame member parallel to the longitudinal axis of the first member.

15. The vehicle chassis of claim 1 wherein the frame member comprises an arcuate shaped frame member wherein at least a portion of the upper surface forms a concave surface and at least a portion of the lower surface forms a convex surface.

16. The vehicle chassis of claim 1 wherein the lower surface of the frame member includes a recess that accommodates at least a portion of the first member.

17. The vehicle chassis of claim 1, further comprising a dampener fixedly coupled between the stanchion member and the wheel mount member, the dampener limiting the pivoting of the first end of the second member about the second end of the first member.

18. The vehicle chassis of claim 17 wherein the dampener comprises a coil-over shock absorber that biases the second member to a defined position relative to the first member.

19. The vehicle chassis of claim 6, further comprising a fluid cooling loop operably coupled to the first member, the fluid cooling loop fluidly coupled to at least the electric traction motor.

20. The vehicle chassis of claim 19 wherein the fluid cooling loop includes at least one air cooled radiator operably coupled to the first member.

21. A two-wheeled vehicle, comprising:
a frame member having a longitudinal axis, an upper surface, a lower surface, and a first end and a second end disposed along the longitudinal axis of the frame member;
a steering assembly pivotably coupled to the first end of the frame member and at a fixed angle with respect to the longitudinal axis of the frame member, the steering assembly including:
a shaft having a longitudinal axis and a first end and a second end disposed along the longitudinal axis of the shaft, the first end of the shaft operably coupled to a steering mechanism manipulable by a human driver and the second end of the shaft including a wheel mount; and
a first member having a longitudinal axis and a first end and a second end disposed along the longitudinal axis of the first member,
the first end of the first member pivotably coupled at a first pivot point to the lower surface of the frame member at a location intermediate to the frame member first end and the frame member second end; and
the first member continuously pivotable through a first arc about the first pivot point, the first arc defined by a first angle measured between the longitudinal axis of the frame member and the longitudinal axis of the first member;
a second member having a longitudinal axis and a first end and a second end disposed along the longitudinal axis of the second member, wherein the first end of the second member pivotably couples to the second end of the first member;
a wheel mount member pivotably coupled to the second end of the second member; and
a third member having a longitudinal axis and a first end and a second end disposed along the longitudinal axis of the third member;
wherein the first end of the third member pivotably couples to a stanchion member physically affixed to the first member; and
wherein the second end of the third member pivotably couples to the wheel mounting member.

22. The two-wheeled vehicle of claim 21, further comprising:
an electric traction motor mount physically coupled to the first member, the electric traction motor mount pivotable with the first member about the first pivot point.

23. The two-wheeled vehicle of claim 22, further comprising:
an electric traction motor fixedly coupled to the electric traction motor mount, the electric traction motor providing at least one shaft output.

24. The two-wheeled vehicle of claim 23, further comprising:

a transmission member operably coupling the at least one shaft output of the electric traction motor to an axle, the axle insertable in an aperture in the wheel mount member and rotatable about an axis normal to the longitudinal axis of the wheel mount member.

25. The two-wheeled vehicle of claim 24 wherein the transmission member comprises at least one of a flexible loop or a chain operably coupling the at least one shaft output of the electric traction motor to the axle.

26. The two-wheeled vehicle of claim 24 wherein the transmission member comprises a shaft member operably coupling the at least one shaft output of the electric traction motor to the axle.

27. The two-wheeled vehicle of claim 23 wherein the frame member further comprises at least one portable electric energy storage device receptacle.

28. The two-wheeled vehicle of claim 27, further comprising:
a number of electrical conductors electrically conductively coupling a portable electric energy storage device received in the portable electric energy storage device receptacle coupled to the frame member with the electric traction motor coupled to the first member.

29. The two-wheeled vehicle of claim 28 wherein each of at least some of the number of electrical conductors include a first electrical connector on the vehicle frame and a complementary second electrical connector on the first member;
wherein the first electrical connector electrically conductively engages the complementary second electrical connector when the first angle is at or below a first defined threshold value.

30. The two-wheeled vehicle of claim 21, further comprising:
a number of removable fasteners operably coupling the frame member to the first member.

31. The two-wheeled vehicle of claim 30 wherein the number of removable fasteners fixedly operably coupling the frame member to the first member maintain the longitudinal axis of the frame member parallel to the longitudinal axis of the first member.

32. The two-wheeled vehicle of claim 21 wherein the frame member comprises an arcuate shaped frame member wherein at least a portion of the upper surface forms a concave surface and at least a portion of the lower surface forms a convex surface.

33. The two-wheeled vehicle of claim 21 wherein the lower surface of the frame member includes a recess that accommodates at least a portion of the first member.

34. The two-wheeled vehicle of claim 21, further comprising a dampener fixedly coupled between the stanchion member and the wheel mount member, the dampener limiting the rotation of the first end of the second member about the second end of the first member.

35. The two-wheeled vehicle of claim 34 wherein the dampener comprises a coil-over shock absorber that biases the second member to a defined position with respect to the first member.

36. The two-wheeled vehicle of claim 23, further comprising a fluid cooling loop operably coupled to the first member, the fluid cooling loop fluidly coupled to at least the electric traction motor.

37. The two-wheeled vehicle of claim 36 wherein the fluid cooling loop includes at least one air cooled radiator operably coupled to the first member.

38. A suspension for a motor vehicle comprising:
a first member having a first longitudinal axis, a first end, and a second end, the first end pivotably coupleable to a motor vehicle chassis and rotatable through a first arc measured with respect to the motor vehicle chassis;
a stanchion member having a first end and a second end, the first end of the stanchion member fixedly attached to an intermediate point of the first member between the first end and the second end of the first member, the second end of the stanchion member projecting outwardly from the first member at a first fixed angle measured with respect to the longitudinal axis of the first member;
a second member having a first end and a second end, wherein the first end of the second member is pivotably coupled to the second end of the first member;
a third member having a first end and a second end, wherein the first end of the third member is pivotably coupled to the second end of the stanchion member;
a wheel mount member pivotably coupled to the second end of the second member and to the second end of the third member;
a dampener operably coupled between the second end of the stanchion member and the second member to limit the rotation of the second member about the first member; and
an axle rotatably coupled to an aperture in the wheel mount member and rotatable about an axis of rotation normal to the longitudinal axis of the first member.

39. The suspension for a motor vehicle of claim 38, further comprising:
an electric traction motor operably coupled to and pivotable with the first member, the electric traction motor providing at least one shaft output.

40. The suspension for a motor vehicle of claim 39, further comprising a transmission member operably coupling the shaft output of the electric traction motor to the axle such that the shaft output of the electric traction motor causes the axle to rotate about the axis of rotation.

41. The suspension for a motor vehicle of claim 40 wherein the transmission member comprises a flexible loop operably coupling the at least one shaft output of the electric traction motor to the axle.

42. The suspension for a motor vehicle of claim 40 wherein the transmission member comprises a shaft member operably coupling the at least one shaft output of the electric traction motor to the axle.

43. The suspension for a motor vehicle of claim 39, further comprising:
a fluid cooling system physically coupled to and pivotable with the first member, the fluid cooling system fluidly coupled to the electric traction motor.

* * * * *